United States Patent
Kim et al.

(10) Patent No.: US 6,763,431 B2
(45) Date of Patent: Jul. 13, 2004

(54) CACHE MEMORY SYSTEM HAVING BLOCK REPLACEMENT FUNCTION

(75) Inventors: Jin-Cheon Kim, Yongin-shi (KR); Jae-Hong Park, Sungnam-shi (KR); Kyung-Hoon Koo, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 225 days.

(21) Appl. No.: 10/094,673

(22) Filed: Mar. 7, 2002

(65) Prior Publication Data

US 2002/0199064 A1 Dec. 26, 2002

(30) Foreign Application Priority Data

Jun. 21, 2001 (KR) ........................... 2001-35425

(51) Int. Cl.[7] ............................................. G06F 12/12
(52) U.S. Cl. .................. 711/128; 711/14; 711/119; 711/133; 711/144
(58) Field of Search ................. 711/119, 122, 711/128, 133, 144, 104

(56) References Cited

U.S. PATENT DOCUMENTS

| | | | |
|---|---|---|---|
| 5,568,632 A | * 10/1996 | Nelson | 711/133 |
| 5,933,860 A | * 8/1999 | Emer et al. | 711/213 |
| 6,490,654 B2 | * 12/2002 | Wickeraad et al. | 711/133 |
| 2001/0001873 A1 | * 5/2001 | Wickeraad et al. | 711/136 |
| 2002/0032841 A1 | * 3/2002 | Yamashiroya | 711/133 |
| 2002/0194431 A1 | * 12/2002 | Koo et al. | 711/122 |
| 2003/0202377 A1 | * 10/2003 | Harari et al. | 365/185.03 |

* cited by examiner

*Primary Examiner*—Matthew Kim
*Assistant Examiner*—H. B. Patel
(74) *Attorney, Agent, or Firm*—Mills & Onello LLP (57) ABSTRACT

A cache memory system includes a tag RAM storing tags in a plurality of sets thereof, a data RAM storing data in a plurality of sets corresponding to the tag RAM sets, and a control logic controlling overall functions in the cache memory. The control logic generates set selection signals which designate the sets storing data replaceable with those of the data RAM in accordance with N-bit data representing a replacement condition of data stored in the data RAM sets. The control logic is composed of counters generating the set selection signals synchronous with a predetermined clock signal in order to modify the sets replaceable data in a random order, so that block replacement logic is constructed in a more simplified form though the number of sets increases in a set-associative cache memory.

14 Claims, 11 Drawing Sheets

Fig. 11 though it may not bring about drastic change — the chances of miss-hit aren't changed even with an increased number of sets in the set-associative cache memory.

CACHE MEMORY SYSTEM HAVING BLOCK REPLACEMENT FUNCTION

RELATED APPLICATION

This application relies for priority upon Korean Patent Application No. 2001-35425, filed on Jun. 21, 2001, the contents of which are herein incorporated by reference in their entirety.

FIELD OF THE INVENTION

The present invention generally relates to cache memory systems and, more specifically, to cache memory systems having a block replacement function.

BACKGROUND OF THE INVENTION

Cache memories, which are common random access memories (RAMs) operable at high frequency, are used in computer systems to enhance data processing efficiency; they are accessible by central processing units (CPUs) more than general memories (e.g., dynamic RAMs). Data frequently accessed by CPUs are stored in the cache memories in order to save data (or signal) transmission times.

A CPU directly accesses a cache memory without using a data-conveying device such as an external memory management unit. As a result, the cache memory is usually positioned at a place physically adjacent to the CPU in order to shorten signal transmission times. An operating feature of a data RAM, including cache memories, in a microprocessor (e.g., 'Alpha AXP 21064 Microprocessor') has been disclosed at pp. 380~383 of "Computer Architecture a Quantitive Approach" published by Morgan Kaufman Publishers Inc., in 1996, and written by David A. Paterners and John L. Hennessy.

Figure 1:
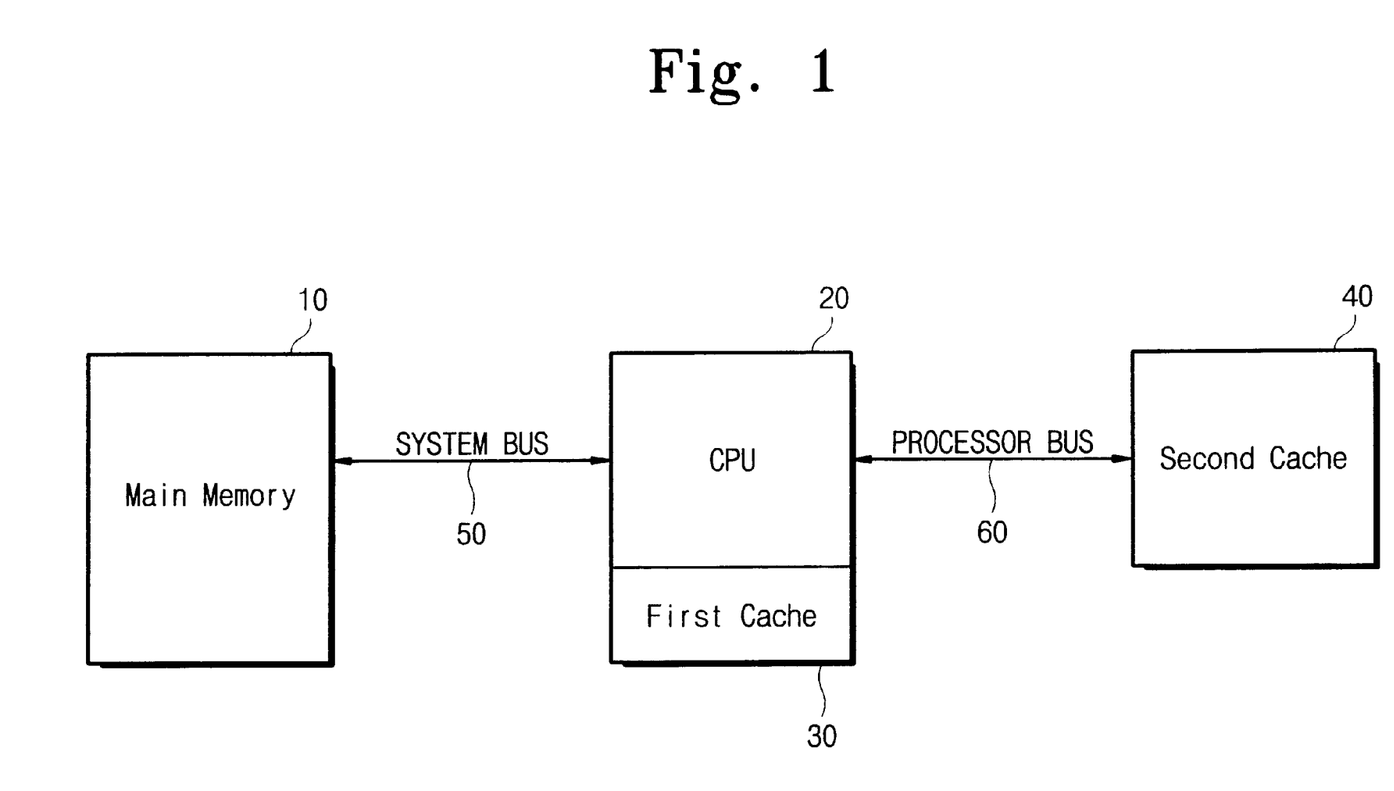
FIG. 1 is block diagram illustrating a hierarchical memory structure.

Referring to FIG. 1, which illustrates hierarchical memory architecture in a computer system, a processor (i.e., CPU) 20 is connected to a main memory 10 through a system bus 50, and to a secondary cache memory (or L2 cache) 40 through a processor bus 60. The architecture shown in FIG. 1 is advantageous to extend the number of bits transferred because the CPU can access the main memory 10 and the secondary cache memory 40 simultaneously, and to advance a latency condition because the secondary cache memory 40 is utilized as a backup memory for a primary cache memory (or L1 cache) 30. However, as data stored in the primary cache memory 30 do not always exist in the secondary cache memory 40, it must check whether or not data assigned to the primary cache memory 30 are present in the secondary cache memory 40 before removing the data from the primary cache memory 30. Therefore, a logical composition for data replacement becomes complicated.

It has been proposed to implement a set-associative cache memory in which memory locations are segmented into a plurality of groups or banks in order to increase a hit rate therein. The groups or the banks are also called sets or ways.

A recent trend of semiconductor manufacturing processes has been promoted to integrate a secondary cache memory on a microprocessor chip as well as a primary cache memory. In the case of embedding a secondary cache memory in a microprocessor chip together with a primary cache memory, it is possible to enhance overall performance of a chip because of a prominent increase in number of data bits accessible between the secondary cache memory and the microprocessor chip. Nevertheless, hit rate may be low because the embedded secondary cache memory sizes up to an areal limit contrary to an external one. While it is changing to increase the number of sets in the set-associative cache memory in order to compensate the degraded hit rate due to the reduced size of the embedded secondary cache memory on the microprocessor chip, the increase in the number of sets causes block replacement logic to be intricate and the circuit area to be enlarged.

There are several ways to replace blocks in a cache memory, such as LRU (Least-Recently-Used), FIFO (First-In-First-Out), and random replacement. LRU needs an additional RAM array to mark blocks of LRU every index of cache while it secures the smallest miss rate. In particular, the RAM array occupies more circuit area in proportion to an increase of the number of sets in the set-associative cache memory, causing an overall circuit size to be larger and a control function to be complex. Using the FIFO also needs an additional RAM array representing an order of block fetch every index, as well as a higher miss rate than any other ways. The random replacement needs a random number while it can be constructed with more simple hardware without an additional RAM array and has a miss rate that is the same with that of the LRU even when the number of sets of the set-associative cache memory increases with increasing cache size.

SUMMARY OF THE INVENTION

It is, therefore, an object of the present invention to provide a cache memory system employing an advanced random replacement approach.

It is another object of the present invention to provide a cache memory system capable of achieving faster operation with simpler logic composition, for block replacement, although sets increase in number.

The invention is directed to a cache memory system which includes a tag memory segmented into a plurality of tag sets storing tags and a data memory segmented into a plurality of data sets storing data bits, corresponding to the tag memory. A storage stores information about replacement with the data stored in the data sets. A selection block generates set selection signals in response to a counting operation to designate an alternative one of the data sets which has replaceable data with reference to the information in the storage circuit.

In one embodiment, each of the data and tag memories is segmented into a plurality of N sets.

The selection block can include a counter for conducting the counting operation from 1 to the N in an iterative sequence in response to a reset signal and a clock signal. A selection circuit can generate the set selection signals corresponding to a first-ordered set among the data sets which is the alternative one having the replaceable data, with reference to the information about the replacement. In one embodiment, the counter generates the counting signals of N bits in which at a specific time point one bit of the N bits is logical 1 and the other bits are logical 0, in response to a reset signal and a clock signal.

The counter can include N flipflops having input signals and first and second output terminals and responding to the reset signal, in which signals applied through the input terminals are output through the first output terminals and inverted at the second output terminals. The input terminal of the first flipflop is connected to the first output terminal of the (N−1)'th flipflop, the input terminal of the second flipflop is connected to the second output terminal of the first flipflop, and the input terminals of the third through (N−1)'th flipflops are connected to the first output terminals of their preceding flipflops.

The storage circuit contains information data of the N bits about replacement with the data stored in the data sets.

In one embodiment, the selection circuits comprises N detectors for generating detection signals of the N bits involved in the first-ordered set having the replaceable data, with reference to the N-bit information data about replacement, corresponding to the data sets. The selection circuit also includes N for generating set selection signals corresponding to the detection signals, in response to the counting signals.

Each of the detectors finds the first-ordered set from a data set, and then generates the N-bit detection signals corresponding to the first-ordered set.

The information data about replacement includes a logical 1 bit when a data set is replaceable with a new data and includes a logical 0 bit when a data set is exclusive to be replaceable with a new data.

Each of the detectors includes N detection cells corresponding to bits of the N-bit information data.

Each of the detection cells comprises a first inverter for inverting a corresponding bit of the N-bit information data; a first transistor connected between first and second nodes, a gate of the first transistor being coupled to the corresponding bit of the N-bit information data; a second transistor connected between a power supply voltage and a third node, a gate of the second transistor being coupled to the second node; a third transistor connected between the power supply voltage and a third node, a gate of the third transistor being coupled to the corresponding bit of the N-bit information data; a fourth transistor connected between the power supply voltage and a fourth node, a gate of the fourth transistor being coupled to the corresponding bit of the N-bit information data; a fifth transistor connected between the first and fourth nodes, a gate of the fifth transistor being coupled to an output signal of the first inverter; a sixth transistor connected between the second node and a fifth node, a gate of the sixth transistor being coupled to the output signal of the first inverter; a seventh transistor connected between the fifth node and the ground voltage, a gate of the seventh transistor being coupled to the corresponding one of the information data; and a second inverter for converting a signal at the third node into a bit of the set selection signals.

Each of the detectors is divided into a quantity K M-bit detection units, where M<N. Each of the M-bit detection units finds a logical 1 bit among the M bits arranged in the N-bit information data and then generates a detection signal of logical 1 corresponding to the logical 1 bit among the M bits.

Each of the M-bit detection units generates a detection signal of a low level when a least one among bits before a corresponding set of M-bit belonging to the N-bit information data is logical 1.

Each of the selectors comprises N transistors for connecting the detection signals and a common node in response to the counting signals, the common node being connected to a corresponding output of the set selection signals.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DESCRIPTION OF THE PREFERRED EMBODIMENTS

In the following detailed description, several specific details are set forth in order to provide a thorough understanding of the present invention. It should be, however, understood that the description of the preferred embodiment is merely illustrative and that it should not be taken in a limiting sense.

Hereinbelow, embodiments of the invention will be explained in conjunction with FIGS. 2 through 11.

The invention is directed to a cache memory system including a tag RAM storing tags in a plurality of sets thereof, a data RAM storing data in a plurality of sets corresponding to the tag RAM sets, and control logic controlling overall functions in the cache memory. The control logic generates set selection signals which alternatively designate the sets storing data replaceable with those of the data RAM in accordance with N-bit data representing a replacement condition of data stored in the data RAM sets. The control logic includes counters generating the set selection signals synchronous with a predetermined clock signal in order to modify the sets of the replaceable data in a random order, so that block replacement logic is constructed in a more simplified form though the number of sets increases in a set-associative cache memory.

Figure 2:
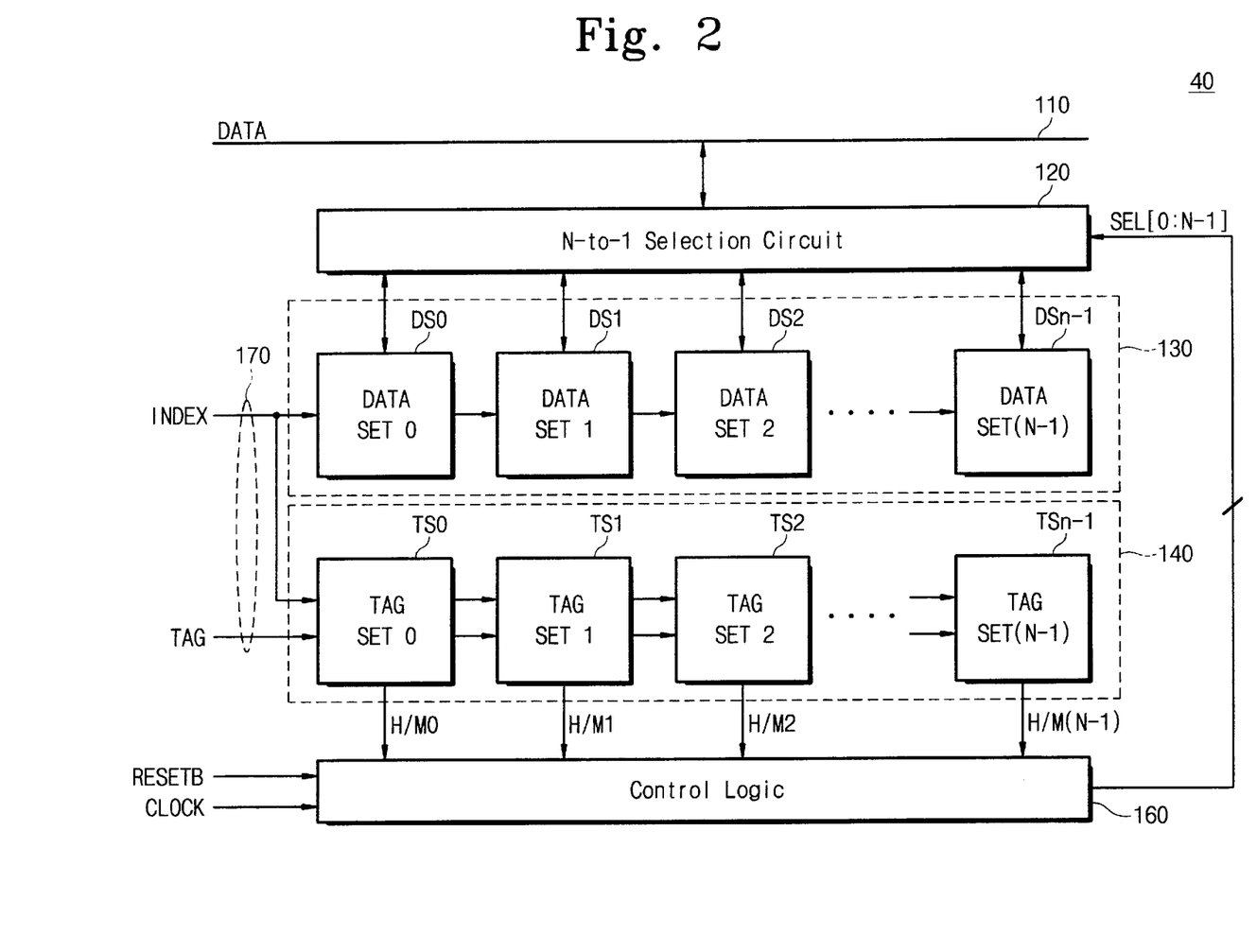
FIG. 2 is a functional block diagram illustrating a secondary cache memory employed in a multi-level cache system according to an embodiment of the invention.

Referring to FIG. 2, which illustrates functional construction of a secondary cache employed in a multi-level cache system according to a preferred embodiment of the invention, a secondary cache memory 40 is composed of N-way set-associative cache memory, where N is a positive integer. The secondary cache memory 40 includes an N-to-1 selection circuit 120, a data RAM 130, a tag RAM 140, and a control logic circuit 160. The data RAM 130 is segmented into data sets DS0~DSn−1 of quantity N, and the tag RAM 140 is segmented into N-numbered tag sets TS0~TSn−1 each corresponding to the data sets DS0~DSn−1. Each of the data and tag RAMs, 130 and 140, is made of a static RAM.

The tag sets TS0~TSn−1 are associated with a plurality of lines or blocks, and the data sets DS0~DSn−1 are associated with a plurality of lines or blocks which correspond to the lines of the tag sets and store data. Index addresses labeled INDEX are applied to the data and tag RAMs 130 and 140 in common to access the memories simultaneously, while tag addresses TAG are applied only to the tag RAM 140. The index and tag addresses, INDEX and TAG, are supplied from a processor such as a central processing unit (e.g., the CPU 20 of FIG. 1), a digital signal processor, or a microcontroller unit.

Fields for storing the tag addresses TAG are constructed in the structure of a content-addressable memory (CAM). Each of the tag sets TS0~TSn-1 generates a hit/miss signal H/Mi (i=0, 1, 2, . . . , or n-1) of a high level (logical "1"), which indicates a "cache hit" state, when the tag address TAG from the CPU 20 matches one stored therein. Alternatively, if the tag address from the CPU 20 does not match one stored therein, a corresponding one of the tag sets generates the hit/miss signal H/Mi at a low level (logical "0"), which indicates a "cache miss" state.

The control logic circuit 160 checks whether or not there are vacant sets among the data RAM sets DS0~DSn-1 when the hit/miss signals H/M0~H/Mn-1 are all low levels from the tag RAM sets TS0~TSn-1. If there are vacant sets among DS0~DSn-1 designated by the index addresses INDEX, data supplied through a data bus 110 from the main memory 10 are stored in the empty data RAM sets. On the other hand, if there is no vacant set among DS0~DSn-1, data stored in one of the data RAM sets DS0~DSn-1 are moved into the main memory 10 and then new data from the main memory 10 are stored in the vacant data RAM set. More detailed procedures in connection with the replacement with sets (or blocks) in the control logic circuit 160 are described below.

Figure 3:
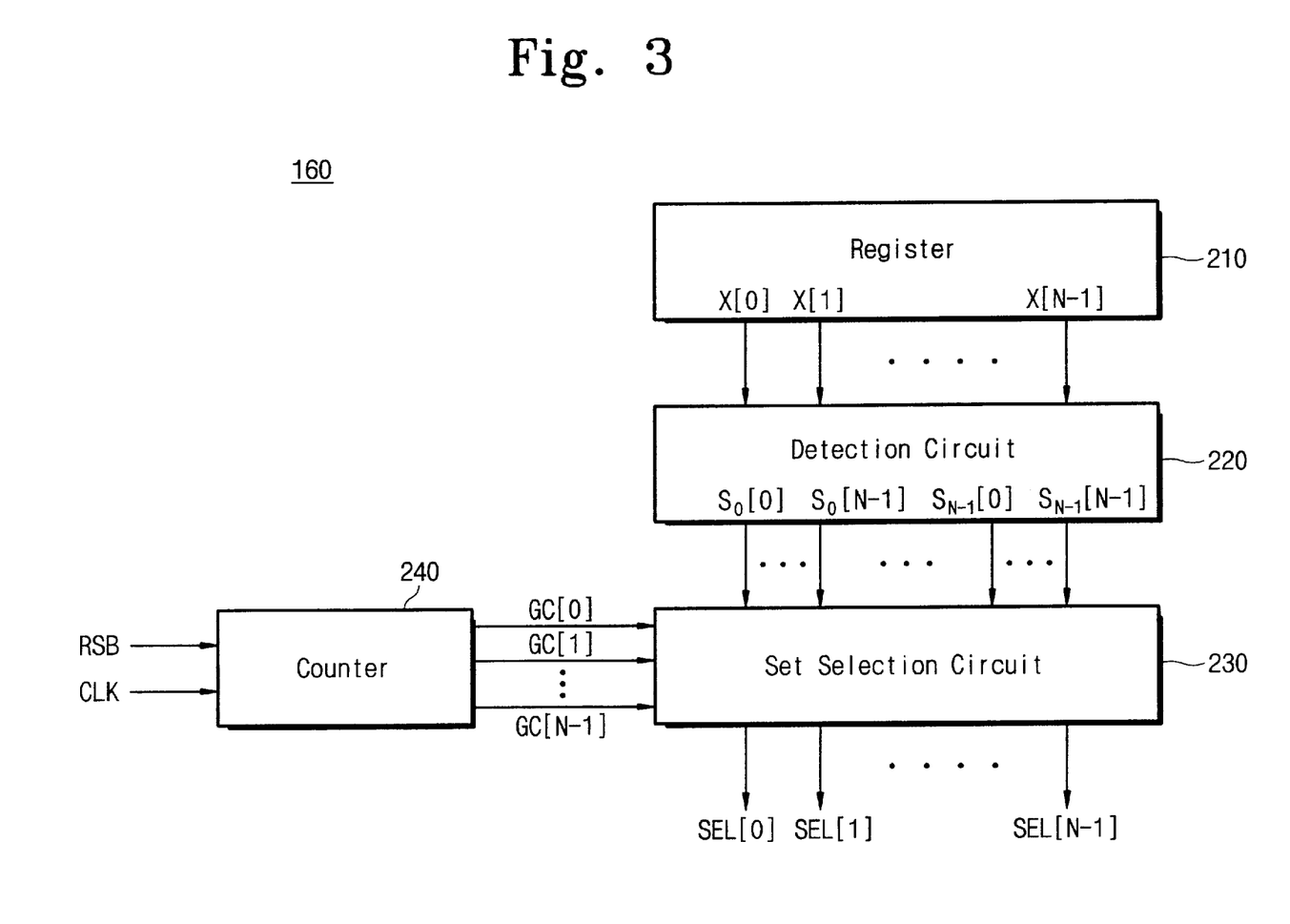
FIG. 3 is a functional block diagram illustrating a composition involved in block replacement performed by a cache control logic shown in FIG. 2.

FIG. 3 illustrates functional composition of the control logic circuit 160, for conducting block replacement operations. Referring to FIG. 3, the control logic circuit 160 includes a register 210, a detection circuit 220, a set selection circuit 230, and a counter 240.

The register 210 stores N-numbered data bits corresponding to the data RAM sets DS0~DSn-1. The data bits held in the register 210 contain information about replacement for the corresponding data RAM sets DS0~DSn-1.

Replacing data of the data RAM sets is dependent upon whether or not their corresponding data are present in the primary cache memory 30 shown in FIG. 1. It is generally necessary to provide inclusion property of cache, for which data stored in the primary cache memory 30 must be contained in the secondary cache memory 40.

For the purpose of that condition, the register 210 generates a logical bit "0" corresponding to a data RAM set having a data bit that is also stored in the primary cache memory 30, indicating replacement for the set is impossible, or generates a logical bit "1" corresponding to a data RAM set not having a data bit that is stored in the primary cache memory 30, indicating replacement for the set is possible.

The detection circuit 220 receives N-numbered data bits X[0]~X[N-1] from the register 210, and then generates detection signal sets Si[0:N-1] (i=0, 1, 2, 3, . . . , and N-1) each of which corresponds to a first-ordered set, from the i'th set (i=0, 1, 2, 3, . . . , or N-1) among the data RAM sets, that contains a replaceable data bit. The first-ordered set means a first set throughout data RAM sets DS0~DSn-1 which stores the replaceable bit that is not stored in the primary cache memory 30 but in the secondary cache memory 40. A detailed construction of the detection circuit 220 will be described with its operation below.

The counter 240 is initiated by a reset signal RSB provided from the CPU 20, and generates counting signals of N-bits GC[1:N-1] in response to a clock signal CLK also provided from the CPU 20. The clock signal CLK is a main clock signal utilized in the CPU 20. The counting signals GC[0:N-1] function as one-hot coded signals in which only one bit is logically "1" at a time while the other bits are all "0".

The CPU 20 accesses the secondary cache memory 40 when a miss occurs in accessing the primary cache memory 30 while executing memory instructions such as LOAD/STORE. In executing a program, the secondary cache memory 40 is randomly accessed by the CPU 20, because not only does the instruction LOAD/STORE occur irregularly, but also the CPU 20 approaches the secondary cache memory 40 irregularly when there is a miss against the primary cache memory 30. Accordingly, if the counter 240 is an up counter or a down counter, the counter 240 may generate a certain value at a time when the CPU 20 accesses the secondary cache memory 40. Thus, it is possible to select an alternative one of the data RAM sets that store replaceable data bits, by using the certain value generated from the counter 240. A detailed construction of the counter 240 will be described with its operation later.

The set selection circuit 230 turns each detection signal set, among Si[0:N-1], corresponding to a bit of "1" among the counting signals GC[0:N-1], into set selection signals SEL[0:N-1]. The set selection signals SEL[0:N-1] are applied to the N-to-1 selection circuit 120 shown in FIG. 2. The selection circuit 120 selects an alternative one of the data RAM sets DS0~DSn-1 in response to the set selection signals SEL[0:N-1]. As a result, a data bit stored in a selected set of the data RAM 130 can be replaced with a new data bit. A detailed construction of the set selection circuit 230 will be described with its operation below.

Figure 4:
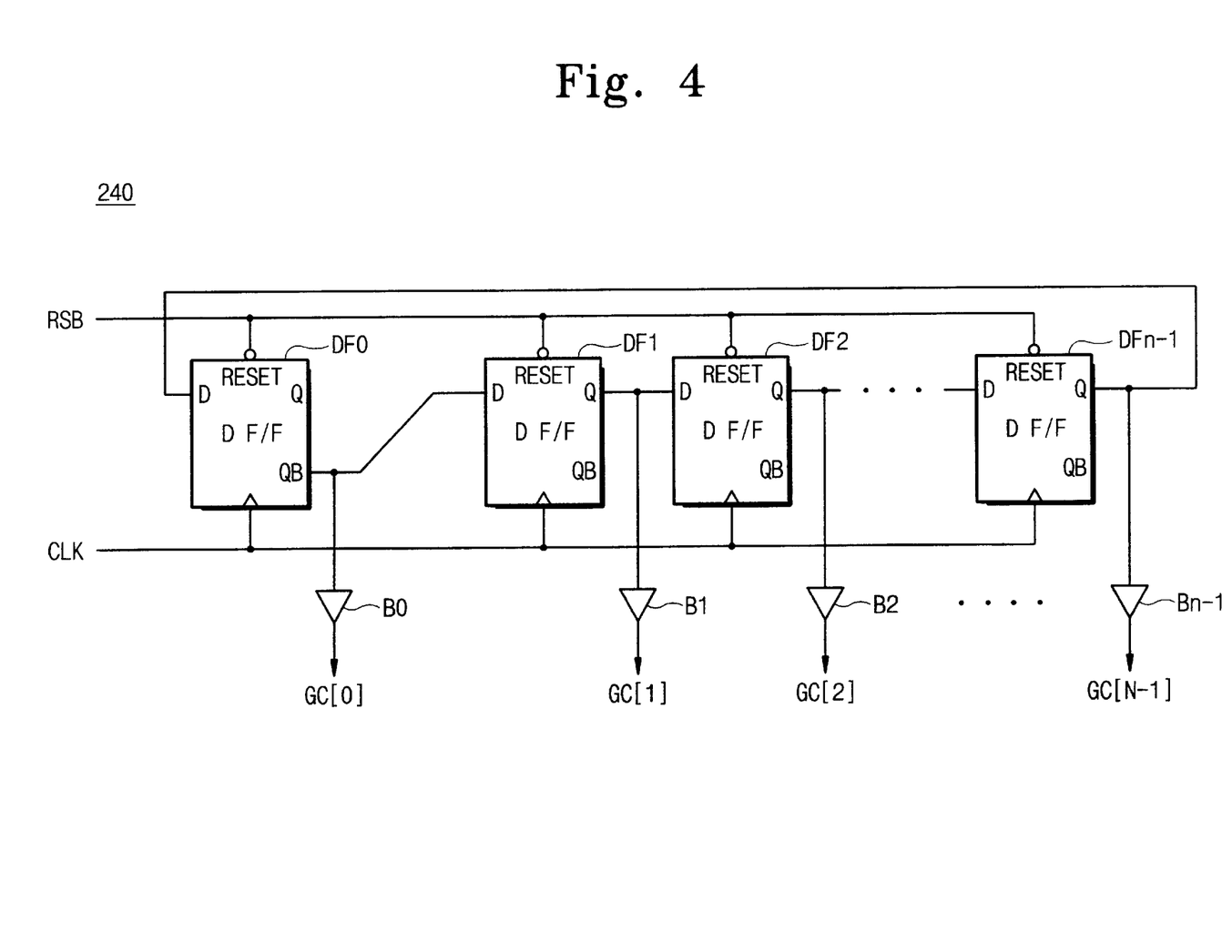
FIG. 4 is a circuit diagram of a counter shown in FIG. 3.

Referring to FIG. 4, the counter 240 is composed of D-flipflops DF0~DFn-1 of quantity N, and buffers B0~Bn-1 of quantity N having a one-to-one correspondence with the D-flipflops.

Each of the D-flipflops DF0~DFn-1 has an input terminal D, a non-inverted output terminal Q, an inverted output terminal QB, a reset terminal RESET, and a clock terminal. DF0's input terminal is connected to DFn-1's non-inverted output terminal, and DF0's inverted output terminal is connected to DF1's input terminal. The input terminals of the D-flipflops DF2~DFn-1 are connected to the non-inverted output terminals of their previous-stage D-flipflops (e.g., DF1~DFn-2), respectively.

The D-flipflop DF0 generates a signal at a low level through its inverted output terminal QB in response to the reset signal RSB at a low level (logically "0") supplied from the CPU 20. The D-flipflops DF1~DFn-1 forward signals input through their input terminals Ds in response to the clock signal CLK out of their inverted output terminals Q. The signals generated from the non-inverted output terminal QB of DF0 and the inverted output terminals Q of DF1~DFn-1 are generated as the counting signals GC[0:N-1] through the buffers B0~Bn-1 corresponding to the D-flipflops DF0~DFn-1.

Therefore, the counter 240 generates the signals GC[0:N-1] of 1000 . . . 00 when the reset signal RSB is active with a low level by the CPU 20. After then, the counting signals GC[0:N-1] change to 0100 . . . 00 at a rising edge (or a falling edge) of the clock signal CLK, and subsequently change to 0010 . . . 00 at the next rising edge (or the next falling edge) of the clock signal CLK. In the same manner, the 1 bit among the N-bit counting signal shifts to the N'th bit position, one by one, along the right direction every rising edge of the clock signal CLK. That is, as formerly stated, considering the random time point accessing the secondary cache memory 40 by the CPU 20, the sole 1 bit is positioned at a certain bit location in the N-bit counting signal GC[0:N−1].

Figure 5:
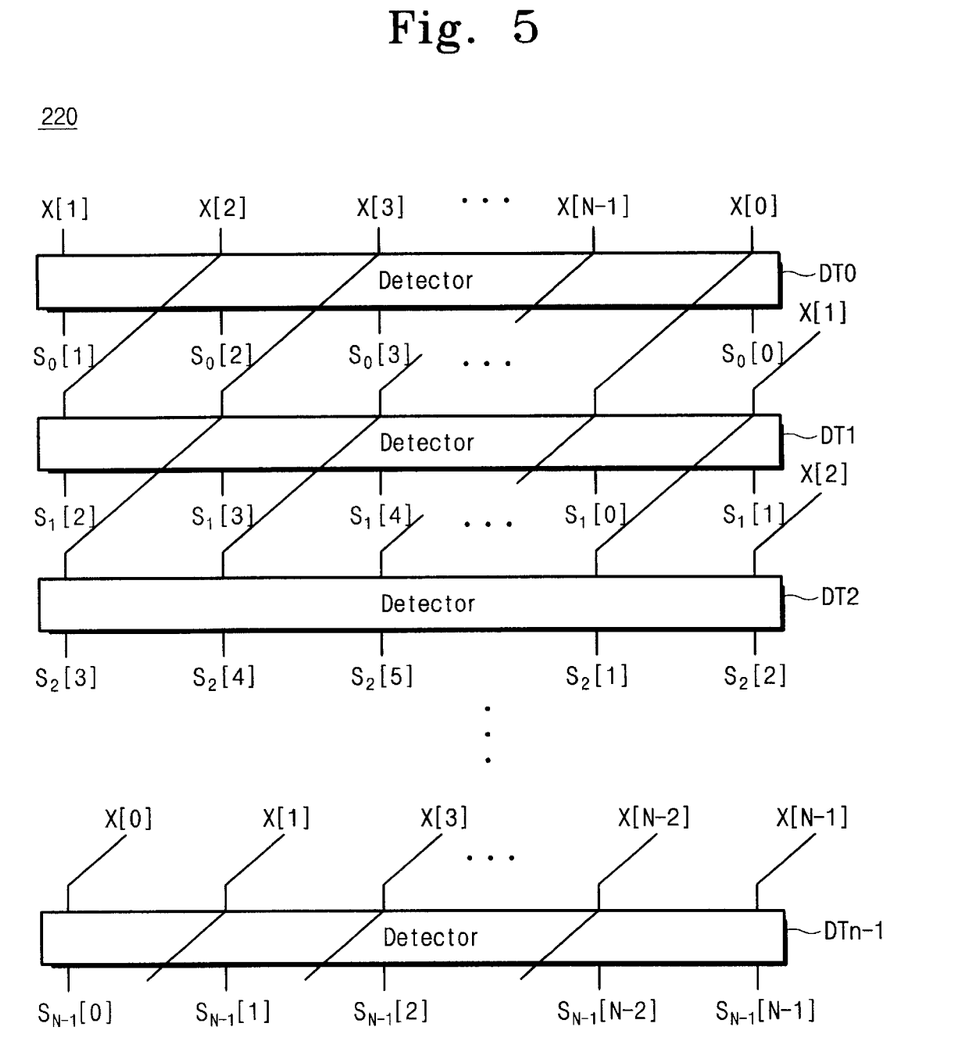
FIG. 5 is a schematic diagram of a detection circuit shown in FIG. 3.

Referring to FIG. 5, the detection circuit 220 shown in FIG. 3 is formed of plural detectors DT0~DTn−1 of quantity N. The first detector DT0 finds a first-ordered data RAM set, from the first data RAM set DS0, storing a replaceable data bit, and then generates a detection signal set $S_0[0:N-1]$ from the first-ordered data RAM set. That is, as each of the data bits X[0:N−1] stored in the register 210 is logical 1 when its corresponding data RAM set has replaceable data bit, or 0 when its corresponding data RAM set has a non-replaceable data bit, the first detector DT0 checks a presence of a 1 data bit throughout the data bits X[0:N−1] from the first bit position to the last bit position and then generates the detection signal set $S_0[0:N-1]$ including a signal bit 1 that corresponds to the 1 data bit. The other signal bits in the detection signal set $S_0[0:N-1]$, except the signal bit 1 at the corresponding bit position, are all 0. For instance, assuming that the data bits X[0:N−1] from the register 210 are patterned 00010 . . . 00, the fourth bit $S_0[4]$ becomes a high level (i.e., 1) while the other bits are all low levels (0). In the same manner, the second detector DT1 checks a first-ordered set, from the second data RAM set DS1, storing a replaceable data bit, and then generates the detection signal set $S_1[0:N-1]$ corresponding thereto. Finally, the N'th detector DTn−1 checks a first-ordered set, from the first data RAM set DS0, storing a replaceable data bit, and then generates the detection signal set $S_{N-1}[0:N-1]$ corresponding thereto.

Figure 6:
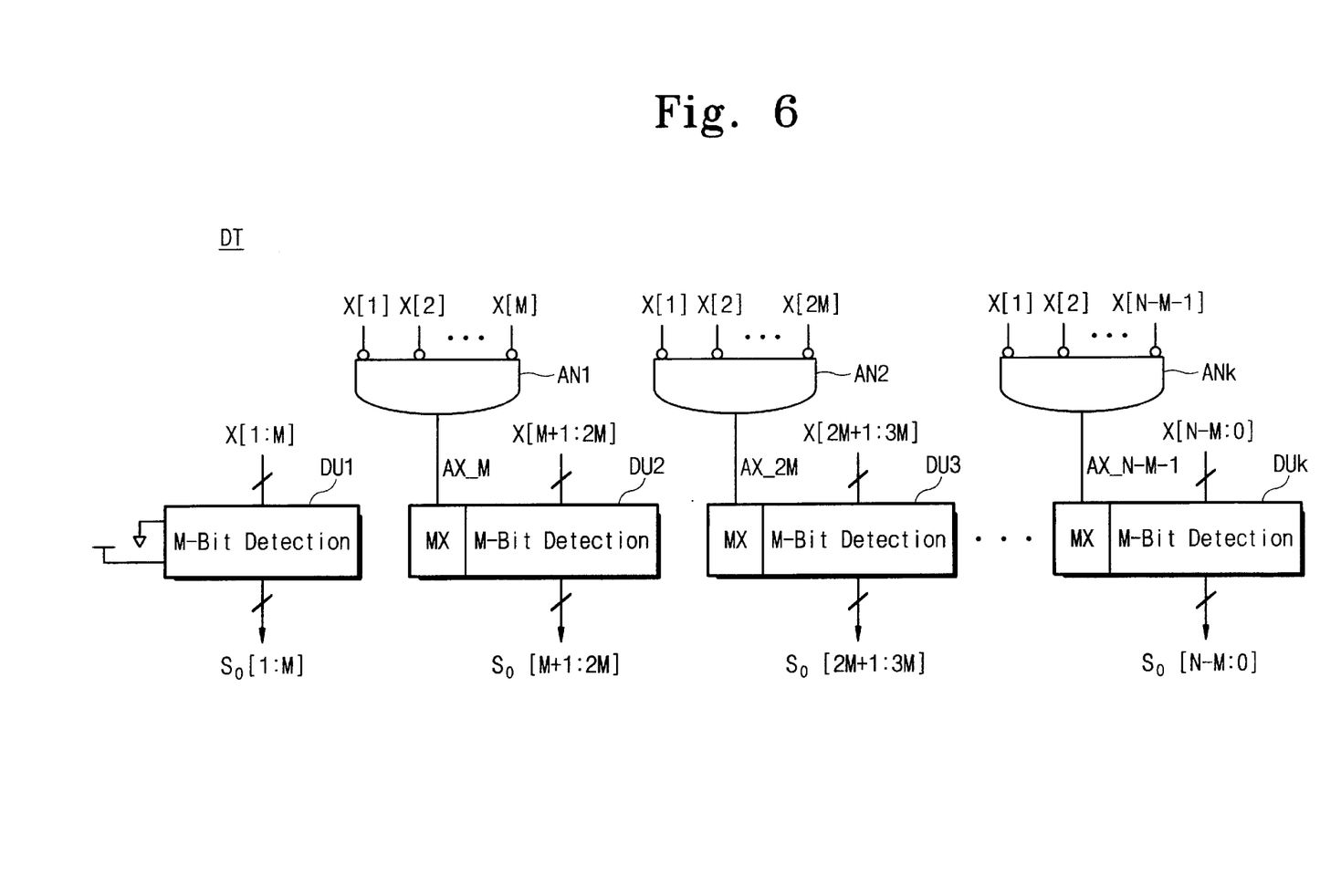
FIG. 6 is a functional block diagram of a detector shown in FIG. 5.

FIG. 6 shows a functional construction of an example of the detector (one of DT0~DTn−1) arranged in the detection circuit 220. Referring to FIG. 6, the detector is composed of a plurality of AND gates AN1~ANk and a plurality of M-bit detection units DU1~Duk. M (or m) is a positive integer smaller than N, and k is a positive number smaller than M. The detectors shown in FIG. 5 are all constructed the same. The M-bit detection unit DU1 checks a first-ordered bit of 1 in data bits X[1:M] (X[1] through X[M]), and the M-bit detection unit DU2 checks a first-ordered bit of 1 in data bits X[M+1:2M] (X[M+1] through X[2M]). The AND gate AN1 generates a signal AX[M] that informs whether or not there is a logical 1 bit ordered before X[M+1] belonging to the data bits X[0:N−1] of the register 210. If there is a logical bit of 1 at least ordered before X[M+1], the AND gate AN1 generates the signal AX[M] of a low level, which makes a sub detection signal set $S_0[M+1:2M]$ from the M-bit detection unit DU2 be established with all low-leveled bits.

As the detector DT is oriented to check a first-ordered bit of 1 from the second data bit X[1] provided from the register 210, there is no need to perform check operations for the remaining data bits after detecting the first-ordered 1 bit among the data bits X[0:N−1]. Therefore, once the AX[M] of a low level is generated from the AND gate AN1, the M-bit detection unit DU2 outputs the low-leveled $S_0[M+1:2M]$ regardless of logic states of data bits X[M+1:2M], which enhances operational speed in the detection unit. The other AND gates AN2~ANk and the M-bit detection units DU3~DUk operate in the same manner.

Figure 7:
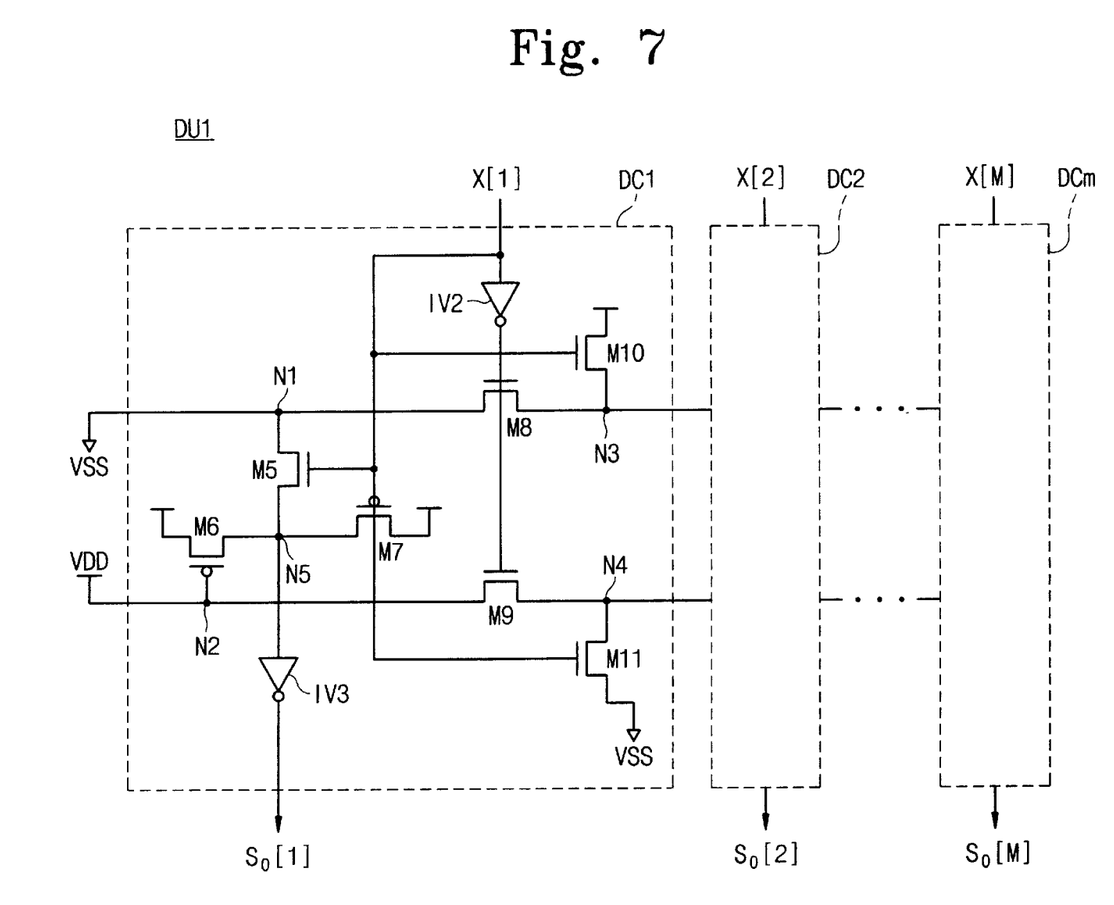
FIG. 7 is a circuit diagram of an M-bit detection unit shown in FIG. 6.

FIG. 7 shows a detailed circuit construction of the M-bit detection unit DU1. Referring to FIG. 7, the M-bit detection unit DU1 includes a plurality of detection cells DC1~DCm of quantity M. The detection cell DC1 is comprised of NMOS transistors M5 and M8~M11, PMOS transistors M6 and M7, and inverters IV2 and IV3. A node N1 is connected to a ground voltage VSS, and a node N2 is connected to a power supply voltage VDD. The inverter IV2 inverts a logical state of the second bit X[1] provided from the register 210. The NMOS transistor M8 whose gate is coupled to an output of the inverter IV2 is connected between the node N1 and a node N3. The NMOS transistor M10 whose gate is coupled to the second bit X[1] has a source-drain channel connected between the power supply voltage VDD and the node N3. The NMOS transistor M9 whose gate is coupled to the output of the inverter IV2 has a channel connected between the node N2 and a node N4. The NMOS transistor M11 whose gate is coupled to the second bit X[1] is connected between the node N3 and the ground voltage VSS. The NMOS transistor M5 whose gate is coupled to the second bit X[1] is connected between the node N1 and a node N5. The PMOS transistor M6 whose gate is coupled to the node N2 is connected between VDD and the node N5. The PMOS transistor M7 whose gate is coupled to the second bit X[1] is connected between VDD and the node N5. The inverter IV3 inverts a logic state of a potential at the node N5 to finally set the detection signal $S_0[1]$.

In FIG. 7, if the second bit X[1] is 0, the NMOS transistors M10 and M11 are turned off while the NMOS transistors M8 and M9 are turned on so as to make the nodes N3 and N4 be VSS and VDD, respectively. Also, the PMOS transistor M7 is turned on to make the node N5 go to VDD, causing the detection signal $S_0[1]$ to be set to a low level. Alternatively, if the second data bit X[1] is 1, the NMOS transistors M8 and M9 are turned off while the NMOS transistors M10 and M11 are turned on to make the nodes N3 and N4 be set to high and low levels respectively. Also, the NMOS transistor M5 is turned on to make the node N5 go to VSS, causing the detection signal $S_0[1]$ to be set to a high level.

The other detection cells DC2~DCm operate in the same circuit construction with that of DC1. Since the second data bit X[1] of 1 establishes the node N3 on a high level, the detection cells DC2~DCm generate their detection signals $S_0[2]~S_0[M]$ even though their corresponding data bits X[2]~X[M] are applied with high levels thereto.

As described above, the M-bit detection unit 310 generates the sub detection signal set $S_0[1:M]$ composed of the one 1 bit and the remaining 0 bits, corresponding to a first-ordered one among the data bits from X[1] to X[M].

Figure 8:
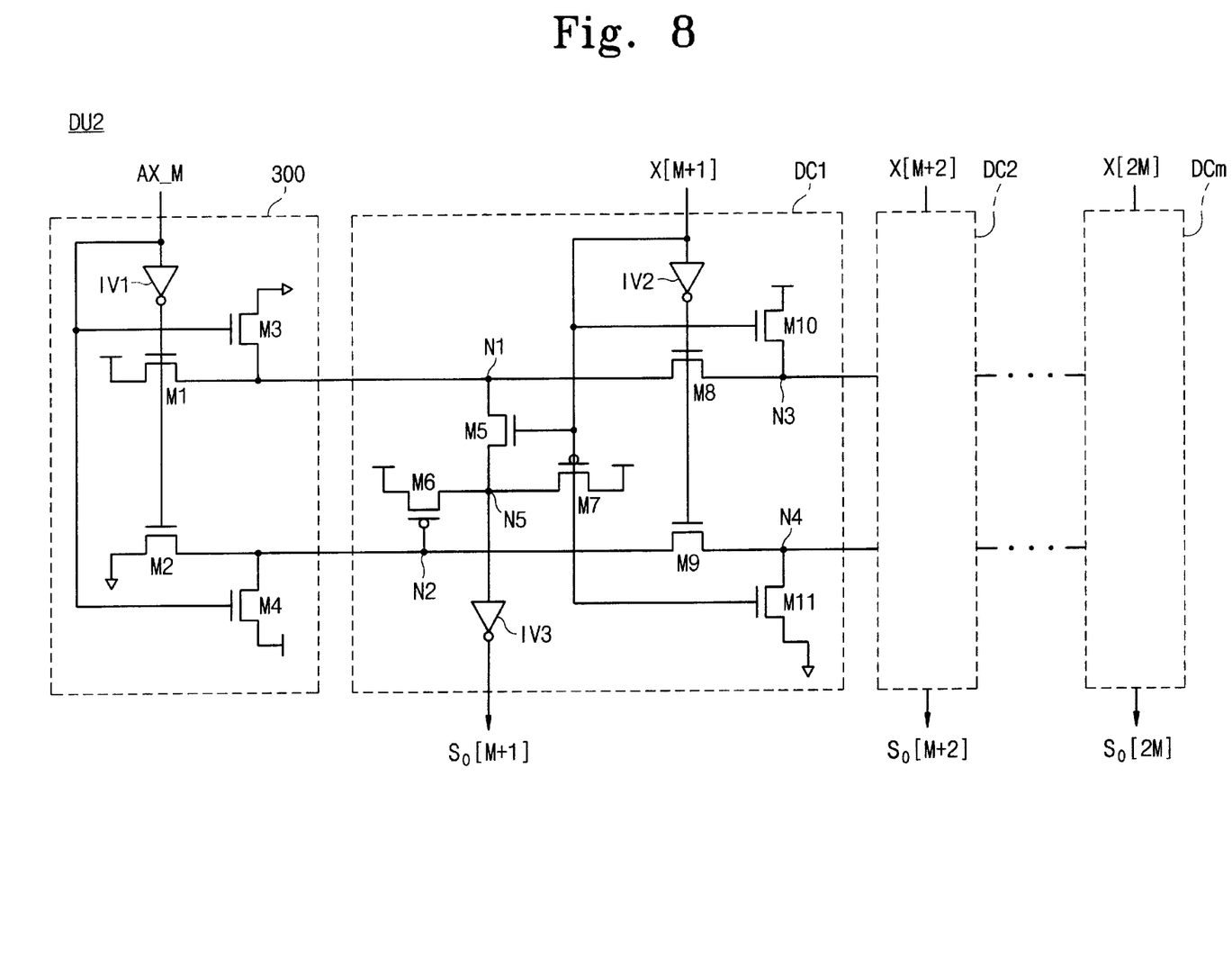
FIG. 8 is a circuit diagram of another M-bit detection unit shown in FIG. 6.

FIG. 8 shows a detailed circuit construction of the M-bit detection unit DU2 which is the same as the M-bit detection units DU3~DUk.

Referring to FIG. 8, the M-bit detection unit DU2 is composed of a voltage setup circuit 300 and a plurality of the detection cells DC1~DCm. The voltage setup circuit 300 establishes voltage levels at the nodes N1 and N2 in response to the signal AX[M] supplied from the AND gate AN1 (AX[2M]~AX[N−M−1] for DU3~DUk, respectively). For instance, when the signal AX[M] is a low level, the node N1 rises up to a high level while the node N2 falls down to a low level. On the other hand, when the signal AX[M] is a high level, the nodes N1 and N2 are set on a low level and a high level, respectively.

In more detail, the voltage setup circuit 300 is formed of an inverter IV1 and NMOS transistors M1~M4. The inverter IV1 inverses a logic state of AX[M]. The NMOS transistor M1 whose gate is coupled to an output of the inverter IV1 is connected between VDD and the node N1. The NMOS transistor M2 whose gate is also coupled to the output of the inverter IV1 is connected between VSS and the node N2. The NMOS transistor M3 whose gate is coupled to AX[M] is connected between VSS and the node N1. The NMOS transistor M4 whose gate is also coupled to AX[M] is connected between VDD and the node N2.

In the voltage setup circuit 300, if AX[M] is a low level, the NMOS transistors M3 and M4 are turned on to set the nodes N1 and N2 at high and low levels, respectively. On the contrary, if AX[M] is a high level, the NMOS transistors M3 and M4 are turned off to set the nodes N1 and N2 low and high, respectively.

As shown in FIG. 8, the detection unit DU2 uses the cells DC1~DCm, also employed in DU1.

In the detection cell DC1 of the unit DU2, when the nodes N1 and N2 are set high and low respectively and the data bit X[M+1] applied thereto is a high level, a voltage level at the node N5 decreases by a threshold voltage (Vth) of the NMOS transistor M5. In this case, the PMOS transistor M6 is conductive to prevent the detection signal $S_0$[M+1] from being active lately. Meantime, when the nodes N1 and N2 are set low and high respectively in response to the signal AX[M] at a low level, the detection signal $S_0$[M+1] accords to the data bit X[M+1]. In the remaining detection cells DC2~DCm, the nodes N1 and N2 are laid on low and high levels respectively in response to AX[M] of a low level supplied from the AND gate AN1, and their detection signals are the same with the data bits applied thereto when the detection signals of their pre-stage detection cells are all low levels.

Figure 9:
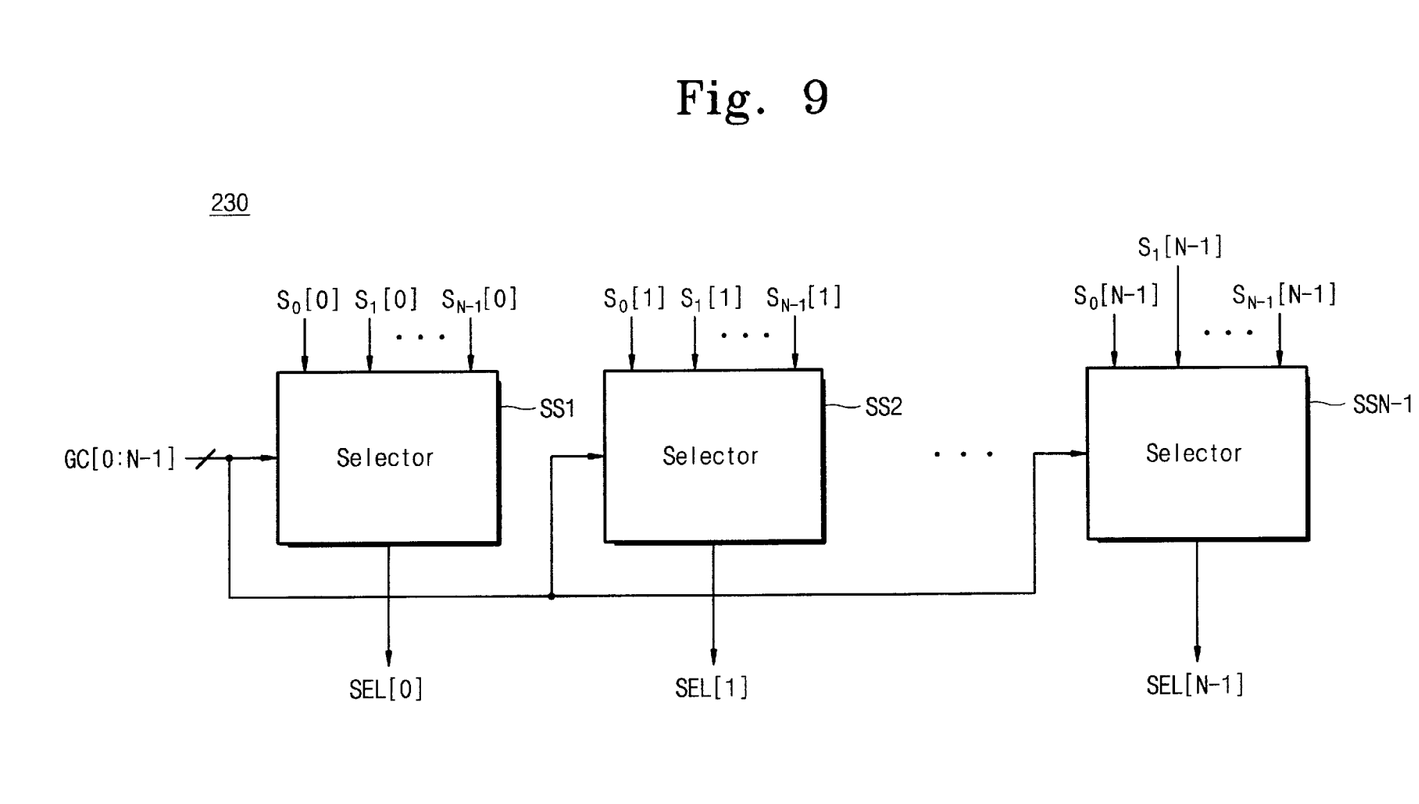
FIG. 9 is a functional block diagram of s selection circuit shown in FIG. 3.

Referring to FIG. 9, the set selection circuit 230 shown in FIG. 3 is composed of a plurality of selectors SS0~SSn-1 of quantity N. The first selector SS0 generates the set selection signal SEL[0] assigned to an alternative one of the detection signals $S_0$[0]~$S_{N-1}$[0] in response to the counting signals GC[0:N-1]. The second selector SS1 generates the set selection signal SEL[1] assigned to an alternative one of the detection signals $S_0$[1]~$S_{N-1}$[N-1] in response to the counting signals GC[0:N-1]. In the same manner, the last selector SSn-1 generates the set selection signal SEL[N-1] assigned to an alternative one of the detection signals $S_0$[N-1]~$S_{N-1}$[N-1] in response to the counting signals GC[0:N-1].

Figure 10:
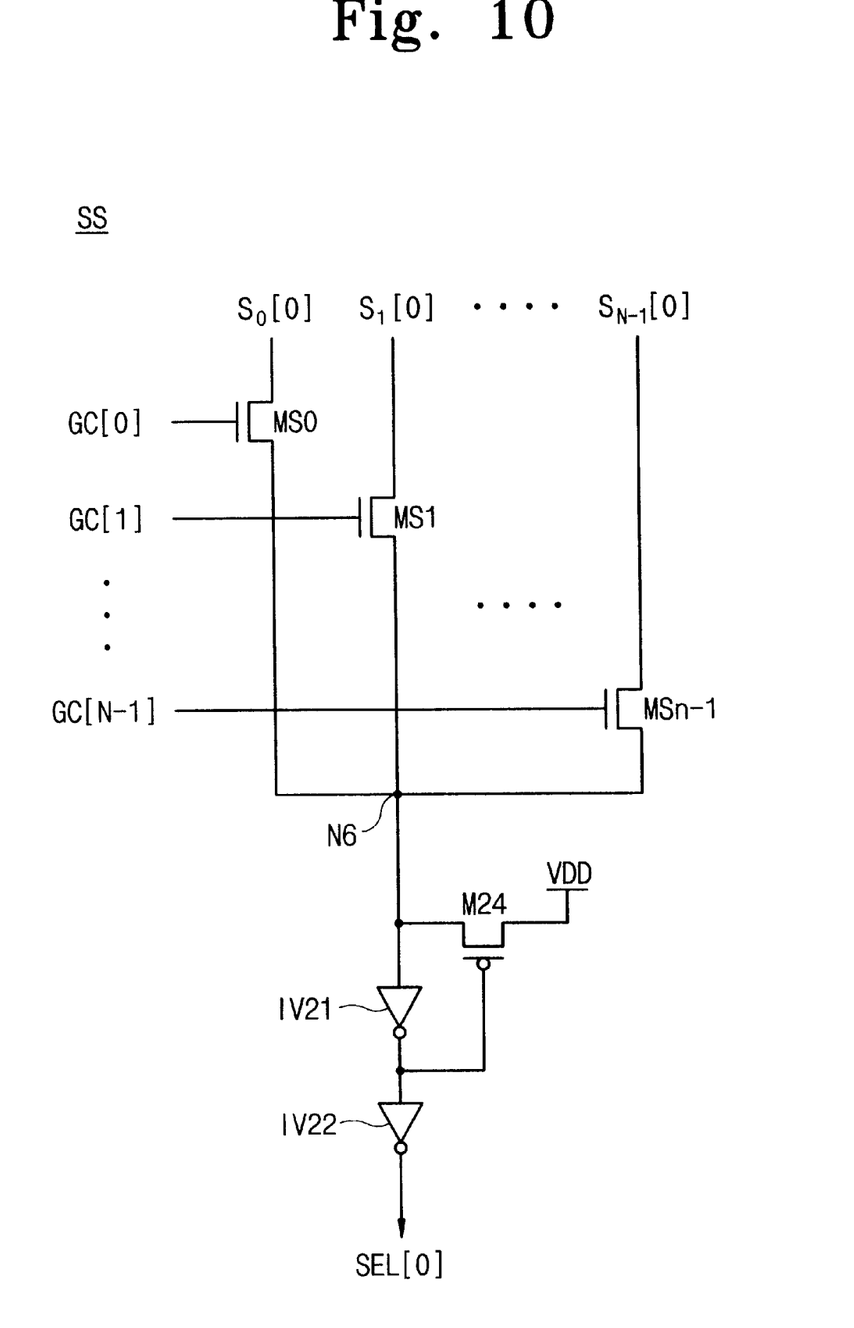
FIG. 10 is a circuit diagram of a selector shown in FIG. 9.

The selectors are constructed with the same circuit architecture. Referring to FIG. 10, the selector SS0, representatively shown as an example of the selectors, is formed of NMOS transistors MS0~MSn-1, a PMOS transistor M24, and inverters IV21 and IV22. The NMOS transistors MS0~MSn-1 whose gates are coupled respectively to the counting signals GC[0:N-1] are each connected between the set selection signals $S_0$[0]~$S_{N-1}$[0] and a common node N6. The inverter IV21 inverts a voltage level at the node N6. The PMOS transistor M24 whose gate is coupled to an output of the inverter IV21 is connected between VDD and the node N6. The inverter IV22 converts the output of the inverter IV21 into the set selection signal SEL[0]. The PMOS transistor M24 assists a voltage level at the common node N6 to be recovered to VDD when the node N6 goes to a high level, which accelerates an output operation of the set selection signal SEL[0].

Figure 11:
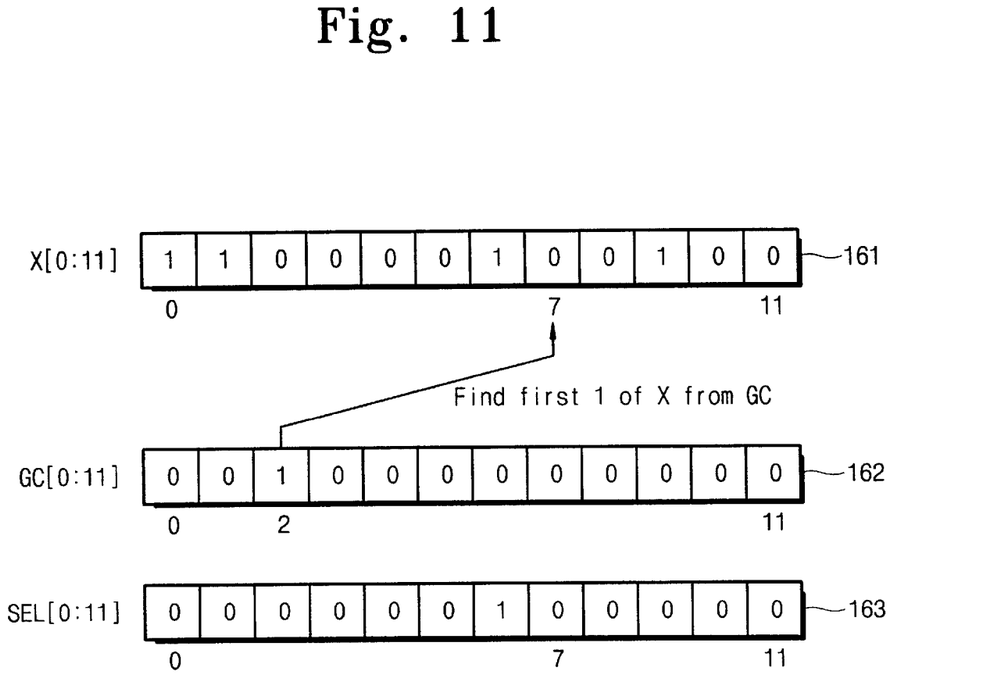
FIG. 11 is a schematic illustrating states of signals in the cache control logic shown in FIG. 3 during operation of the cache control logic.

FIG. 11 shows logical states of the data bits X[0:N-1], the counting signals GC[0:N-1], and the set selection signals SEL[0:N-1], these are conductive by the control logic circuit 160 shown in FIGS. 3 through 10, assuming that the data and tag RAMs, 130 and 140, are respectively segmented into 12 sets (i.e., the N is 12).

It also assumes that the data bits X[0:11] stored in the register 210 are set to 110000100100 in binary coding, and the counting signals GC[0:11] generated from the counter 240 are 00100000000 at the time when the CPU 20 accesses the secondary cache memory 40.

With respect to an operation for replacing the data bits of the cache memories, referring first to FIG. 5, as the data bits X[0:11] provided from the register 210 are 110000100100, the detection signals $S_0$[1:11] and $S_0$[0] from the first detector DT0, $S_1$[2:11] and $S_1$[0:1] from the second detector DT1, $S_2$[3:11] and $S_2$[0:2] from the third detector DU2, and $S_{11}$[0:11] from the last detector DT11 are 100000000000, 000010000000, 000100000000, and 100000000000, respectively. The 100000000000 of $S_0$[1:11] and $S_0$[0] is set such that its first-ordered bit of 1 is located at the second bit position of 110000100100 of X[0:11]. Also, assuming that a starting position of scanning a first-ordered 1 shifts to a right direction by one bit position, the 000010000000 of $S_1$[2:11] and $S_1$[0:1] is set from that its first-ordered bit of 1 is located at the seventh bit position (that becomes the fifth bit position in the bit set of $S_1$[2:11] and $S_1$[0:1]) of 110000100100 of X[0:11]. And the 000100000000 of $S_2$[3:11] and $S_2$[0:2] is set from that its first-ordered bit of 1 is located at the sixth bit position (that becomes the fourth bit position in the bit set of $S_2$[3:11] and $S_2$[0:2]) of 110000100100 of X[0:11].

Next, referring to FIG. 9, as GC[0:N-1] from the counter 240 is 001000000000, the third data RAM set DS2 of the secondary cache memory 40 has a replaceable bit not stored in the primary cache memory 30, the third sub detection signal set $S_2$[1:11] is assigned thereto and the set selectors SS0~SS11 generate the set selection signals SEL[0]~SEL[11] in response to the sub detection signal set $S_2$[1:11], i.e., the detection signals $S_2$[1]~$S_2$[11].

At this time, the selected sub detection signal set $S_2$[1:11] is 000001000000 ($S_2$[5]=1) because the bit arrangement of $S_2$[3:11] and $S_2$[0:2] is 000100000000 in order. Thus, in FIG. 10, as the third counting signal GC[2] is a high level (i.e., 1), the third NMOS transistors (e.g., MS2) of the selectors SS0~SS11 are conductive to transfer the set selection signals $S_2$[0], $S_2$[1], $S_2$[2], $S_2$[3], $S_2$[4], $S_2$[5], $S_2$[6], $S_2$[7], $S_2$[8], $S_2$[9], $S_2$[10], and $S_2$[11] to the set selection signals SEL[0]~SEL[11] corresponding thereto. Thus, the set selection signals SEL[0]~SEL[11] are 0, 0, 0, 0, 0, 1, 0, 0, 0, 0, 0, and 0, respectively, in order, which designates the sixth data RAM set (e.g., DS5) to be replaced. As a result, data stored in the sixth data RAM set DS5 moves into the main memory 10 and then new data is put into the sixth data RAM set.

As described above, the invention provides a replacement function in which a data set to store replaceable data is selected by a counter. Selection signals for designating the replaceable data set are driven by the counter that generates counting signals adaptable to the condition of random access to a cache memory by a CPU. It is possible to simplify block replacement logic composition even while with an increased number of data sets, for example in a set-associative cache memory system. Moreover, operating speed can be enhanced by using cache control logic according to the present invention.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A cache memory system comprising:
   a tag memory segmented into a plurality of tag sets of a quantity N storing tags;

a data memory segmented into a plurality of data sets of quantity N storing data bits, corresponding to the tag memory;

a register inside a control logic for storing information about replacement with the data stored in the data sets; and a set selection circuit inside the control logic for generating set selection signals in response to a counting operation, the set selection circuit including a counter for generating counting signals of N bits, in which at one specific time point one bit of the N bits is in a first logical state and the remaining bits of the N bits are in a second logical state, in response to a reset signal and a clock signal, to designate an alternative one of the data sets which has replaceable data with reference to the information in the register inside the control logic, the set selection circuit generating the set selection signals, in response to the counting signals including the bit of the first logical state, corresponding to a first-ordered set among the data sets which is the alternative one having the replaceable data, with reference to the information about the replacement; wherein the first-ordered set is a first set of data RAM sets which stores a replacement bit that is not stored in a primary cache memory but is stored in a secondary cache memory.

2. The cache memory system of claim 1, wherein the counter is comprised of N flipflops having input signals and first and second output terminals and responding to the reset signal, in which signals applied through the input terminals are output through the first output terminals and inverted at the second output terminals;

wherein the input terminal of a first flipflop is connected to the first output terminal of the (N−1)'th flipflop, the input terminal of a second flipflop is connected to the second output terminal of the first flipflop, and the input terminals of third through (N−1)'th flipflops are connected to the first output terminals of their preceding adjacent flipflops.

3. The cache memory system of claim 2, wherein the register inside the control logic stores information data of N bits about replacement with the data stored in the data sets.

4. The cache memory system of claim 3, wherein the selection circuits comprises:

N detectors for generating detection signals of N bits involved in the first-ordered set having the replaceable data, with reference to the N-bit information data about replacement, corresponding to the data sets; and N selectors for generating set selection signals corresponding to the detection signals, in response to the counting signals.

5. The cache memory system of claim 4, wherein each of the detectors finds the first-ordered set from a data set, and then generates the N-bit detection signals corresponding to the first-ordered set.

6. The cache memory system of claim 5, wherein each of the detectors is divided into M-bit detection units of a quantity K, where M<N;

wherein each of the M-bit detection units finds a logical 1 bit among the Mbits arranged in the N-bit information data and then generates a detection signal of logical 1 corresponding to the logical 1 bit among the M-bits.

7. The cache memory system of claim 6, wherein each of the M-bit detection units generates a detection signal of a low level when a least one bit before a corresponding set of M bits belonging to the N-bit information data is logical 1.

8. The cache memory system of claim 4, wherein each of the selectors comprises N transistors for connecting the detection signals and a common node in response to the counting signals, the common node being connected to a corresponding output of the set selection signals.

9. The cache memory system of claim 3, wherein the information data about replacement includes a logical 1 bit when a data set is replaceable with new data and includes a logical 0 bit when a data set is exclusive to be replaceable with a new data.

10. The cache memory system of claim 5 or 9, wherein each of the detectors includes N detection cells corresponding to bits of the N-bit information data.

11. The cache memory system of claim 10, wherein each of the detection cells comprises:

a first inverter for inverting a corresponding bit of the N-bit information data;

a first transistor connected between first and second nodes, a gate of the first transistor being coupled to the corresponding bit of the N-bit information data;

a second transistor connected between a power supply voltage and a third node, a gate of the second transistor being coupled to the second node;

a third transistor connected between the power supply voltage and a third node, a gate of the third transistor being coupled to the corresponding bit of the N-bit information data;

a fourth transistor connected between the power supply voltage and a fourth node, a gate of the fourth transistor being coupled to the corresponding bit of the N-bit information data;

a fifth transistor connected between the first and fourth nodes, a gate of the fifth transistor being coupled to an output signal of the first inverter;

a sixth transistor connected between the second node and a fifth node, a gate of the sixth transistor being coupled to the output signal of the first inverter;

a seventh transistor connected between the fifth node and the ground voltage, a gate of the seventh transistor being coupled to the corresponding one of the information data; and a second inverter for converting a signal at the third node into a bit of the set selection signals.

12. The cache memory system of claim 11, wherein, in the first one of the detection cells, the first and second nodes are connected to the ground voltage and the power supply voltage, respectively.

13. The cache memory system of claim 11, wherein, in the first one of the detection cells, the first and second nodes are connected to a voltage setup circuit that initializes the first detection cell.

14. The cache memory system of claim 11, wherein the first and second nodes are connected to the fourth and third nodes that belong to a former detection cell.

* * * * *